Nov. 28, 1939.  I. E. JOHANSSON  2,181,456
APPARATUS FOR SEPARATING A LIQUID FROM SOLID MATTERS SUSPENDED THEREIN
Filed Feb. 13, 1937  2 Sheets-Sheet 1

INVENTOR
ISAK E. JOHANSSON
By William C. Linton
ATTORNEY

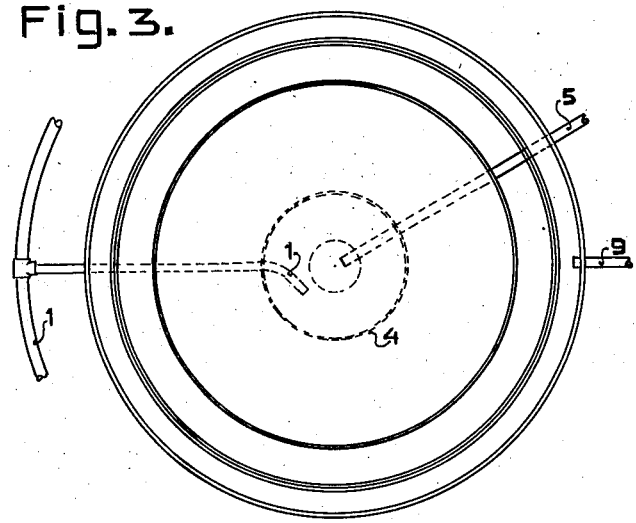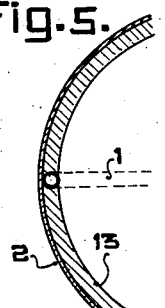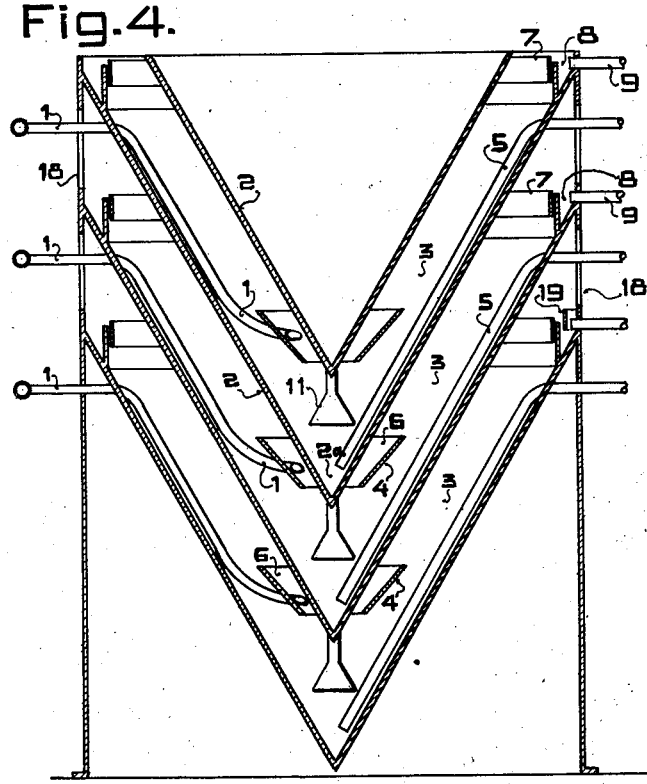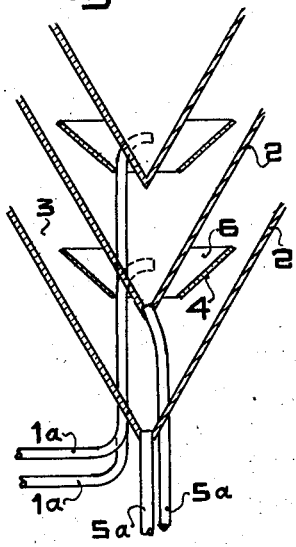

Patented Nov. 28, 1939

2,181,456

UNITED STATES PATENT OFFICE 2,181,456

APPARATUS FOR SEPARATING A LIQUID FROM SOLID MATTERS SUSPENDED THEREIN

Isak Edvin Johansson, Alvsjo, Stockholm, Sweden

Application February 13, 1937, Serial No. 125,638
In Sweden February 17, 1936

4 Claims. (Cl. 210—58)

When it is desired to cause settling of solid matters suspended in a liquid or liquids, for instance in cleansing digesting or waste lyes in the production of sulphate cellulose, large settling cisterns comprising one or more compartments are commonly used. The solid matter containing liquid is introduced into the upper central portion of such a cistern, and the clarified liquid flows off over the edge of the cistern or through outlets provided at the top of the separate compartments.

The solid matter or sludge deposited at the bottom of the cistern is conducted to a discharge pipe. The bottom of the cistern may have inclined surfaces causing the deposit to move along said surfaces to the discharge pipe on account of its own weight, or said bottom may be more or less plane, the deposit being conducted to the discharge pipe by means of mechanically driven scraping means. Both of said types of settling cisterns suffer from disadvantages. In the first-mentioned apparatus the deposited matter settled from the liquid has a tendency of adhering to the oblique bottom surfaces of the settling apparatus, and in cisterns of the last-mentioned type the mechanical means to conduct the deposited matter onto the discharge pipe are expensive and complicated. Further, relatively large apparatuses are required in both cases on account of the separation taking place solely by settling.

The principal object of my invention is to provide an apparatus for the separation of a liquid from solid matters suspended therein which apparatus is of relatively small dimensions as compared with settling cisterns hitherto used and ensures a rapid and effective separation without the deposited matters sticking to the surfaces of the apparatus and without the use of mechanically driven means to conduct the deposits onto the discharge pipe. On account of the small dimensions of the apparatus its heat radiating surfaces are correspondingly reduced which is of advantage when treating liquids which should not be cooled during the treatment.

A further object of my invention is to provide an apparatus of the type described in which the solid matters suspended in the liquid are separated from the liquid not only by a settling action but also by centrifugation, the centrifugal motion of the liquid contributing to prevent the solid matters from adhering to the surfaces of the apparatus.

These and further objects of my invention will be apparent according as the following description proceeds reference being had to the accompanying drawings showing by way of example some embodiments of my improved separating apparatus.

In the drawings—

Figs. 3 and 4 are corresponding views of a second embodiment.

Fig. 5 is a partial horizontal sectional view of a funnel-shaped element.

Fig. 6 shows a modification.

Figure 1:
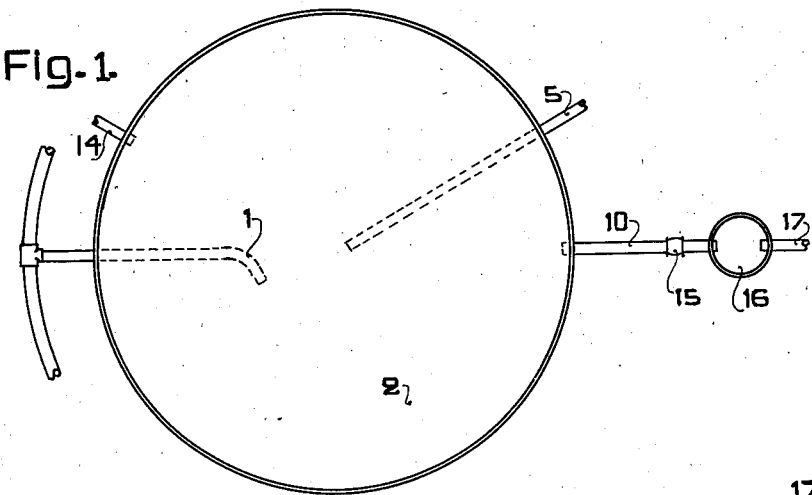
Fig. 1 is a plan view of my apparatus according to a first embodiment.
Figure 2:
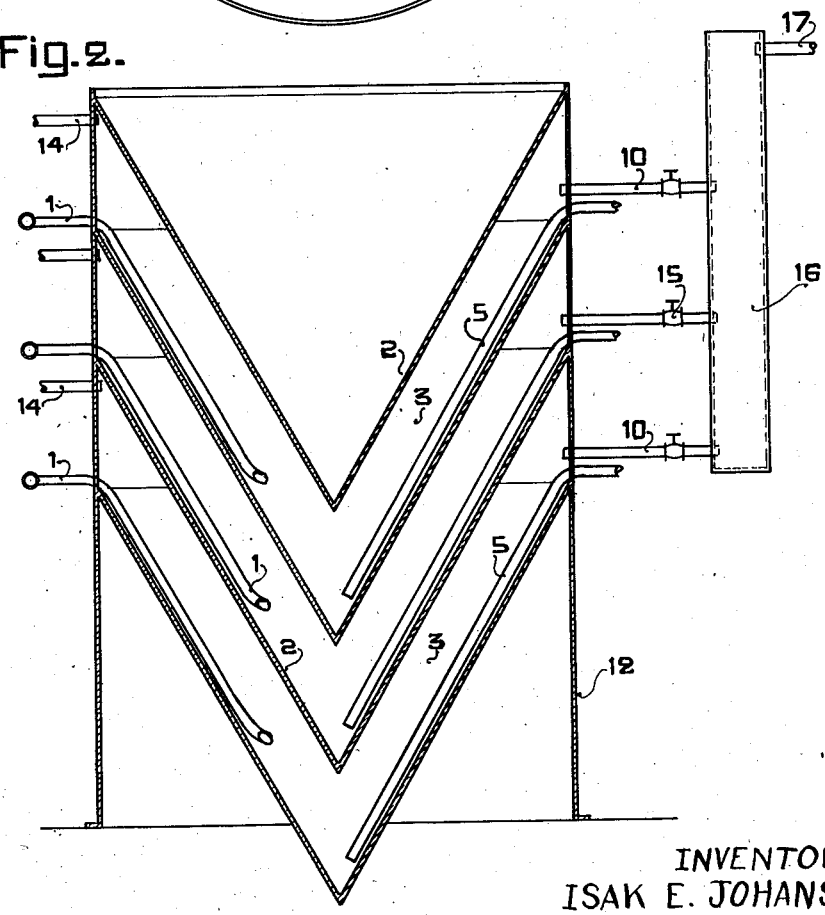
Fig. 2 is a corresponding vertical sectional view thereof.

According to Figs. 1 and 2 the apparatus comprises an outer casing or stand 12 serving as support for a plurality of funnel-shaped elements 2 circular in horizontal section and disposed coaxially the one within the other so as to form between them a corresponding number of separating chambers 3. The inclination of the funnels may vary according to the liquid mixture to be treated. Extending into each of said chambers 3 is a supply pipe or pipes 1 for the solid matter containing liquid to be separated. This supply pipe 1 terminates at or at a little distance above the lowermost portion of the upper limiting wall of the chamber 3, and at its end it is bent upwards. By the bent formation of the end of the pipe 1 and on account of the circular shape of the elements 2 the liquid flowing out through the pipes 1 is given a rotating motion on account of its energy of flow. This causes the solid matters contained in the liquid to be deposited not only by settling but also by centrifugation, the solid matters being thereby prevented from adhering to the surfaces of the separating chambers 3. The velocity of the rotating motion of the liquid is greatest at the place at which the liquid enters the separating chambers and decreases gradually upwards ceasing wholly at the top of the apparatus at a given velocity of the entering liquid.

The clarified liquid ascends in the form of an upper helical stream along the upper wall of the separating chambers 3, whereas the solid matters or sludge separated from the liquid flows in the form of a lower helical stream downwardly along the lower wall of the chambers 3. According as the velocity of the liquid decreases upwards any remaining solid matters are separated from the liquid and fall down into and are brought along by the lower stream loaded by solid substances. By the clarified liquid moving upwards along the upper funnel-shaped wall of the separating chambers 3 and the sludge separated off moving downwards along the lower funnel-shaped wall of said chambers the advantage is gained that liquid which has been clarified to a certain extent is not mixed with sludge or sludge-loaded liquid which has been separated off in higher zones of the apparatus.

The clarified liquid flows through a control valve 15 into a collecting vessel 16 and is discharged through a pipe 17. The deposited sludge is collected in the lower portion of the separating chambers 3 from where it is removed through the sludge discharge pipes 5. Particles or froth lighter than the liquid may be removed through outlets 14 provided at the top of the separating chambers 3.

In the apparatus according to Figs. 1 and 2 all of the compartments 3 are wholly closed and separated from each other by the walls 2 and 12. Thus, the apparatus may operate at a certain given pressure, and the clarified liquid may without the use of pumps or the like be led off at a level corresponding to the pressure of the entering liquid reduced by the loss of pressure as a consequence of the centrifugation of the liquid.

The embodiment shown in Figs. 3 and 4 differs from that above described in the following respects.

The supply pipes 1 for the solid matter containing liquid open into a chamber 6 formed by a conical ring 4 and serving to suppress the whirling motion of the liquid before it enters the separating chambers 3. Further, conical screens 11 are provided which contribute to cause the sludge to follow the bottom of the separating chambers in the lowest portion thereof. This arrangement has shown to be advantageous particularly when separating liquid mixtures in which the solid matters have a relatively high specific weight, for instance in the flotation of certain minerals, metals or the like. The clarified liquid flows out over adjustable over-flow rings 7 into collecting ducts 8 provided outside thereof and then out through discharge pipes 9. A screen 19 may be provided to separate particles lighter than the liquid such as froth or the like. Provided in the outer wall 12 of the apparatus are openings 18 for inspection and the like which are in communication with the atmosphere. What is mentioned above in connection with the embodiment according to Figs. 1 and 2 is applicable also to this embodiment.

According to Fig. 5 a layer of cement finish 13 or the like of a smooth surface is applied to the upper surface of the funnel-shaped walls 2, said layer 13 having such a thickness that the pipes 1 and 5 are wholly embedded therein so that no projecting parts disturb the even flow of the rotating liquid. Evidently, such a layer 13 may be used in both embodiments.

According to Fig. 6 supply pipes 1a and discharge pipes 5a extend into the separating chambers 3 from below instead of from above as shown in the previous embodiments. Evidently, such pipes may be connected to the apparatus also in other manners as for instance through a central shaft.

The separating chambers 3 of the apparatus as well as a number of apparatuses may be combined in series, in parallel or in any combination thereof in which case several liquids may be treated simultaneously. It is also possible to design the apparatus in such manner that two or more of the separating chambers 3 communicate with each other.

My invention is generally applicable to all sorts of separation of liquid irrespective of the nature of the solid substances suspended therein.

What I claim is:

1. An apparatus for separating liquid from liquid mixtures containing solid matters, comprising a plurality of cone-shaped elements disposed the one within the other in spaced relationship so as to form chambers therebetween having upper and lower walls formed by two adjacent elements, a supply pipe for the liquid mixture to be treated opening into each of said chambers at a point above the lowest portion of the upper wall thereof, the mouth of said pipe being so disposed in relation to the upper wall of the chamber as to cause the liquid mixture leaving the pipe to perform a helical motion upwardly along said upper wall, thereby causing separation of solid matters by centrifugal action, a discharge pipe for solid matters separated off connected with the lower portion of each of said chambers and an outlet for clarified liquid at the top of each chamber.

2. An apparatus for separating liquid from liquid mixtures containing solid matters, comprising a plurality of cone-shaped elements disposed the one within the other in spaced relationship so as to form chambers therebetween having upper and lower walls formed by two adjacent elements, a supply pipe for the liquid mixture to be separated extending downwardly into each of said chambers and ending at a point above the lowest portion of the upper wall thereof, the end of said pipe being bent in such manner as to cause the liquid mixture leaving the pipe to perform a helical motion upwardly along the upper wall of the chamber, thereby causing separation of solid matters by centrifugal action, a discharge pipe for solid matters separated off connected with the lower portion of each of said chambers and an outlet for clarified liquid at the top of each chamber.

3. An apparatus for separating liquid from liquid mixtures containing solid matters, comprising a plurality of circular funnel-shaped elements disposed the one within the other in spaced relationship so as to form chambers between them having upper and lower walls formed by two adjacent elements, a funnel-shaped ring disposed around the apex of each of the funnels defining the upper walls of the chambers and forming a space therewith, a supply pipe for the liquid mixture to be separated discharging into said space, the mouth of said pipe being so disposed in relation to the upper wall of the chamber as to cause eddy currents of the entering liquid to be suppressed within said space and the liquid to perform a uniform helical motion upwardly along the upper wall of the chamber, thereby causing separation of solid matters by centrifugal action, a discharge pipe for the solid matter separated off connected with the lower portion of each of the said chambers and an outlet for clarified liquid at the top of each chamber.

4. An apparatus for separating liquid from liquid mixtures containing solid matters, comprising a plurality of circular funnel-shaped elements disposed the one within the other in spaced relationship so as to form chambers between them having upper and lower walls formed by two adjacent elements, a supply pipe for the liquid mixture to be separated extending downwardly into each of said chambers close to the one wall thereof, a coating on said wall having a smooth surface and a thickness sufficient to cause the pipe to be embedded therein, said supply pipe ending at a point not below the lowest portion of the upper wall of the chamber, the mouth of the supply pipe being so disposed in relation to said upper wall as to cause the liquid mixture leaving the pipe to perform a helical motion upwardly along said wall, thereby causing separation of solid matters by centrifugal action, a discharge pipe for solid matters separated off connected with the lower portion of each of the chambers and an outlet for clarified liquid at the top of each chamber.

ISAK EDVIN JOHANSSON.